United States Patent
Abbasi Gavarti et al.

(10) Patent No.: US 11,009,412 B2
(45) Date of Patent: *May 18, 2021

(54) MICROELECTROMECHANICAL SCALABLE BULK-TYPE PIEZORESISTIVE FORCE/PRESSURE SENSOR

(71) Applicant: STMICROELECTRONICS S.R.L., Agrate Brianza (IT)

(72) Inventors: Mohammad Abbasi Gavarti, Milan (IT); Daniele Caltabiano, Agrate Brianza (IT); Andrea Picco, Monza (IT); Anna Angela Pomarico, San Cesario Lecce (IT); Giuditta Roselli, Lecce (IT); Francesco Braghin, Varese (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/904,123

(22) Filed: Jun. 17, 2020

(65) Prior Publication Data
US 2020/0319040 A1    Oct. 8, 2020

Related U.S. Application Data

(63) Continuation of application No. 15/894,770, filed on Feb. 12, 2018, now Pat. No. 10,724,909.

(30) Foreign Application Priority Data

Feb. 21, 2017 (IT) .................. 102017000019426

(51) Int. Cl.
*G01L 1/18* (2006.01)
*G01L 9/06* (2006.01)
(Continued)

(52) U.S. Cl.
CPC ............. *G01L 1/18* (2013.01); *G01L 1/26* (2013.01); *G01L 9/0002* (2013.01); *G01L 9/06* (2013.01);
(Continued)

(58) Field of Classification Search
CPC ....... G01L 1/18; G01L 19/146; G01L 9/0002; G01L 1/26; G01L 9/06; H01C 10/10;
(Continued)

(56) References Cited

U.S. PATENT DOCUMENTS 4,236,137 A * 11/1980 Kurtz .................... G01L 9/0042
257/419
5,539,236 A * 7/1996 Kurtz .................... G01P 15/123
257/415
(Continued)

FOREIGN PATENT DOCUMENTS

CN         1614371 A      5/2005
CN      106197776 A     12/2016
(Continued)

OTHER PUBLICATIONS

Karl Hofmann, "An Introduction to Measurements using Strain Gages", 1989 (273 pages).
(Continued)

*Primary Examiner* — Nathaniel T Woodward
(74) *Attorney, Agent, or Firm* — Seed Intellectual Property Law Group LLP

(57) ABSTRACT

A microelectromechanical force/pressure sensor has: a sensor die, of semiconductor material, having a front surface and a bottom surface, extending in a horizontal plane, and made of a compact bulk region having a thickness along a vertical direction, transverse to the horizontal plane; piezoresistive elements, integrated in the bulk region of the sensor die, at the front surface thereof; and a cap die,
(Continued)

coupled above the sensor die, covering the piezoresistive elements, having a respective front surface and bottom surface, opposite to each other along the vertical direction, the bottom surface facing the front surface of the sensor die. A conversion layer is arranged between the front surface of the sensor die and the bottom surface of the cap die, patterned to define a groove traversing its entire thickness along the vertical direction; the piezoresistive elements are arranged vertically in correspondence to the groove and the conversion layer is designed to convert a load applied to the front surface of the cap die and/or bottom surface of the sensor die along the vertical direction into a planar stress distribution at the groove, acting in the horizontal plane.

18 Claims, 11 Drawing Sheets

(51) Int. Cl.
*G01L 19/14* (2006.01)
*G01L 9/00* (2006.01)
*G01L 1/26* (2006.01)
*H01C 10/10* (2006.01)
*H01C 17/00* (2006.01)

(52) U.S. Cl.
CPC ............ *G01L 19/146* (2013.01); *H01C 10/10* (2013.01); *H01C 17/00* (2013.01)

(58) Field of Classification Search
CPC .. H01C 17/00; B81B 1/00; B81B 7/02; B81B 2201/02; B81C 1/00015
USPC ..................................................... 73/862.627
See application file for complete search history.

(56) References Cited

U.S. PATENT DOCUMENTS

| | | | |
|---|---|---|---|
| 5,587,601 A * | 12/1996 | Kurtz | G01L 19/0038 257/417 |
| 6,131,466 A | 10/2000 | Vigna et al. | |
| 8,669,964 B2 * | 3/2014 | Lee | G06F 3/045 345/174 |
| 9,804,047 B2 | 10/2017 | Pagani et al. | |
| 2004/0118213 A1 * | 6/2004 | Ou | G01L 9/0054 73/754 |
| 2008/0087105 A1 | 4/2008 | Renken et al. | |
| 2008/0208425 A1 * | 8/2008 | Riccoti | G01L 9/0054 701/70 |
| 2008/0223143 A1 * | 9/2008 | Murari | G01L 9/0045 73/727 |
| 2008/0289417 A1 * | 11/2008 | Okada | G01P 15/0922 73/504.03 |
| 2012/0205653 A1 * | 8/2012 | Nishikage | G01L 9/0054 257/49 |
| 2014/0182390 A1 | 7/2014 | Pagani et al. | |
| 2014/0242740 A1 * | 8/2014 | Qi | G01L 9/0042 438/53 |
| 2019/0113411 A1 * | 4/2019 | Wong | G01L 9/06 |

FOREIGN PATENT DOCUMENTS

CN 106257254 A 12/2016
EP 3098584 A1 11/2016

OTHER PUBLICATIONS

W. Kurniawan et al., "Bulk-type piezoresistive force sensor for high pressure applications", *Procedia Chemistry* 1(2009) 544-547.

* cited by examiner

| Applied Force [ N ] | Output Voltage @20° C [ mV / V ] | Output Voltage @120° C [ mV / V ] | Output Voltage @-40° C [ mV / V ] |
|---|---|---|---|
| 0 | 0 | -3 | -2 |
| 3150 | 17,5 | 14,5 | 15 |
| 6300 | 35 | 32 | 33 |
| 9450 | 52,5 | 49,5 | 50 |
| 12600 | 70,5 | 67,5 | 68 |

| Applied Force [ N ] | Output Voltage @20° C [ mV / V ] | Output Voltage @120° C [ mV / V ] | Output Voltage @-40° C [ mV / V ] |
|---|---|---|---|
| 0 | 0 | -2 | -1,5 |
| 16 | 16 | 14 | 14,5 |
| 32 | 32 | 30 | 30,5 |
| 48 | 48 | 46 | 46,5 |
| 64 | 65 | 62 | 62,5 |

| Applied Pressure [ bar ] | Output Voltage @20° C [ mV / V ] | Output Voltage @120° C [ mV / V ] | Output Voltage @-40° C [ mV / V ] |
| --- | --- | --- | --- |
| 0 | 0 | -2 | -1,5 |
| 150 | 8,5 | 6,5 | 7 |
| 300 | 17 | 15 | 15,5 |
| 450 | 25,5 | 23,5 | 24 |
| 600 | 34 | 32 | 32,5 |

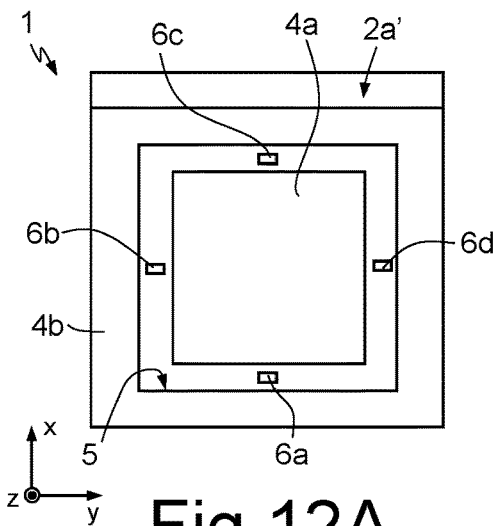
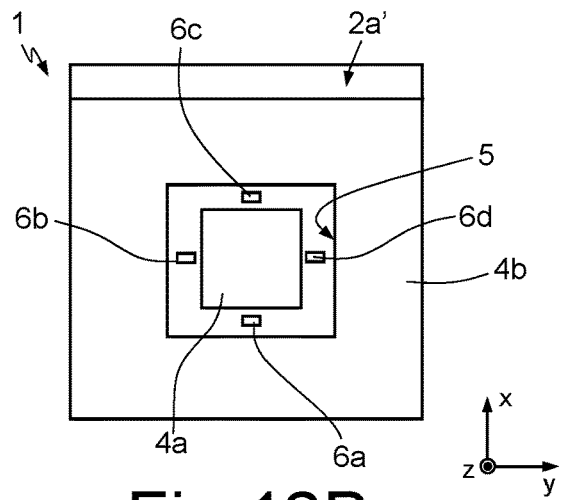
Fig.12A Fig.12B
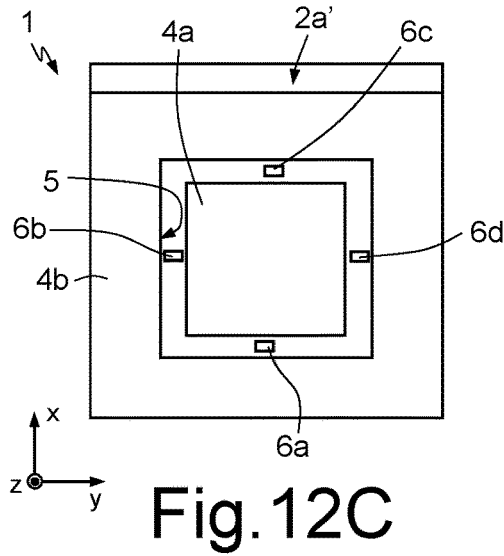
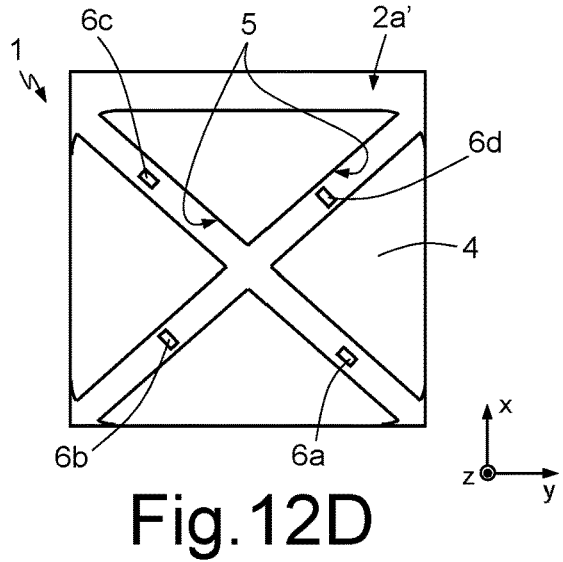
Fig.12C Fig.12D
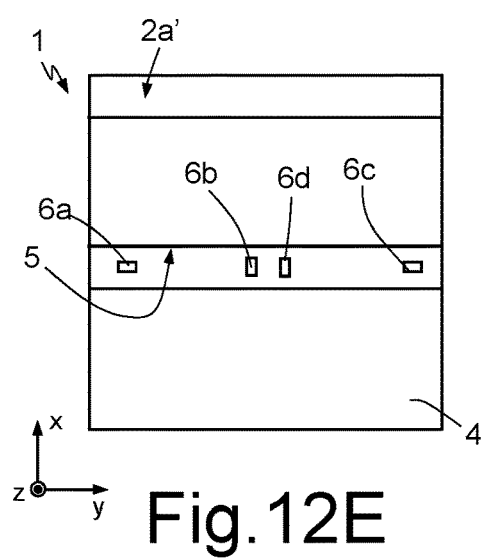
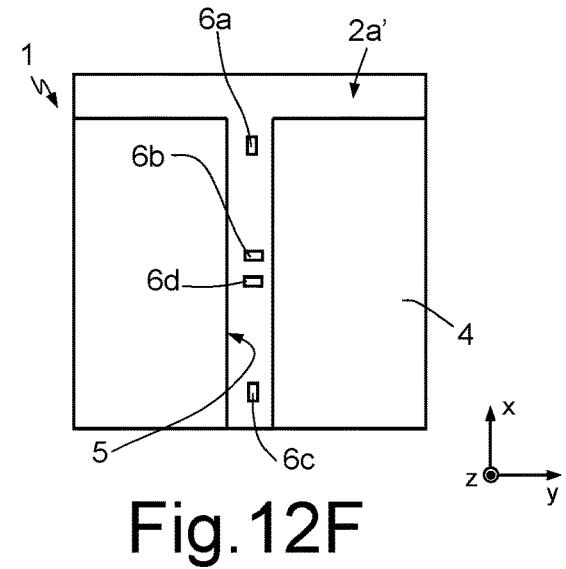
Fig.12E Fig.12F

MICROELECTROMECHANICAL SCALABLE BULK-TYPE PIEZORESISTIVE FORCE/PRESSURE SENSOR

BACKGROUND

Technical Field

The present disclosure relates to a microelectromechanical scalable bulk-type piezoresistive force/pressure sensor.

Description of the Related Art

There are several applications, e.g., in the industrial or automotive fields, requiring use of force/pressure sensors with a high full-scale value, for measuring high-range load (force or pressure) values, e.g., up to 10 kN or higher.

Known sensor solutions for sensing high-range loads generally envisage use of high strength metallic load cells, including different kinds of strain gauges as sensing elements. The strain gauge sensing elements detect the geometric deformation of the core to which they are coupled via changes in electrical resistance.

Although commonly used, the drawbacks of these sensors are a low sensitivity and a limited possibility of miniaturization.

Integrated pressure sensors, made using semiconductor technology, are also known, using piezoresistive elements integrated in a silicon die to detect the applied pressure.

A drawback of these sensors is the requirement of complex package structures, in order to convert an applied load to a stress acting on the silicon die and the integrated piezoresistor. These sensors are therefore expensive and generally do not allow easy customization, in particular with respect to the range of applied load.

For example, a known integrated pressure sensor is disclosed in "Bulk-type piezoresistive force sensor for high pressure applications", W. Kurniawan, R. Tjandra, E. Obermeier, Proceedings of the Eurosensors XXIII conference, Procedia Chemistry 1 (2009) 544-547. The solution disclosed in this document is based on the application of a force on closely neighboring protruded islands on a Silicon die, to induce a mechanical stress in the region between the islands. For pressure measurement, the pressure is transformed into a force using a housing with a metal diaphragm and a coupled metal rod. The sensor die is manufactured using SOI technology, which simplifies the realization of the protruded islands.

Although having a good sensitivity and allowing miniaturization, also this sensor suffers from the above discussed drawback of having an expensive and complex manufacturing process and package design to convert an externally applied pressure to a force concentrated on the silicon die.

BRIEF SUMMARY

Provided is a microelectromechanical sensor that is easy to manufacture, offering a high level of customization and having a high detection sensitivity and a method for forming same.

BRIEF DESCRIPTION OF THE SEVERAL VIEWS OF THE DRAWINGS

For a better understanding of the present disclosure, preferred embodiments thereof are now described, purely by way of non-limiting example, with reference to the attached drawings, wherein:

FIGS. 12A-12F are plan views of further embodiments of a force/pressure sensor according to the present solution.

DETAILED DESCRIPTION

One or more embodiments are directed to exploiting the piezoresistivity effect of bulk silicon to design a new MEMS (Micro-Electro-Mechanical System) integrated force/pressure sensor, to sense from few N/bar up to several kN/kbar of external forces/pressures (by scaling up, or down, the corresponding size, and due to the high strength of silicon material).

As will be discussed in detail in the following, the sensor comprises two bodies (dies) of semiconductor material, in particular silicon, which are bonded together, with sensing elements, in particular piezoresistor elements, being formed at a top surface of a bottom die (sensor die).

A conversion layer, of a suitable material as described below, is placed on the sensor die, with a special pattern in order to convert applied vertical force/pressure into a desired planar stress, which is sensed by the piezoresistor elements.

Figure 1A:
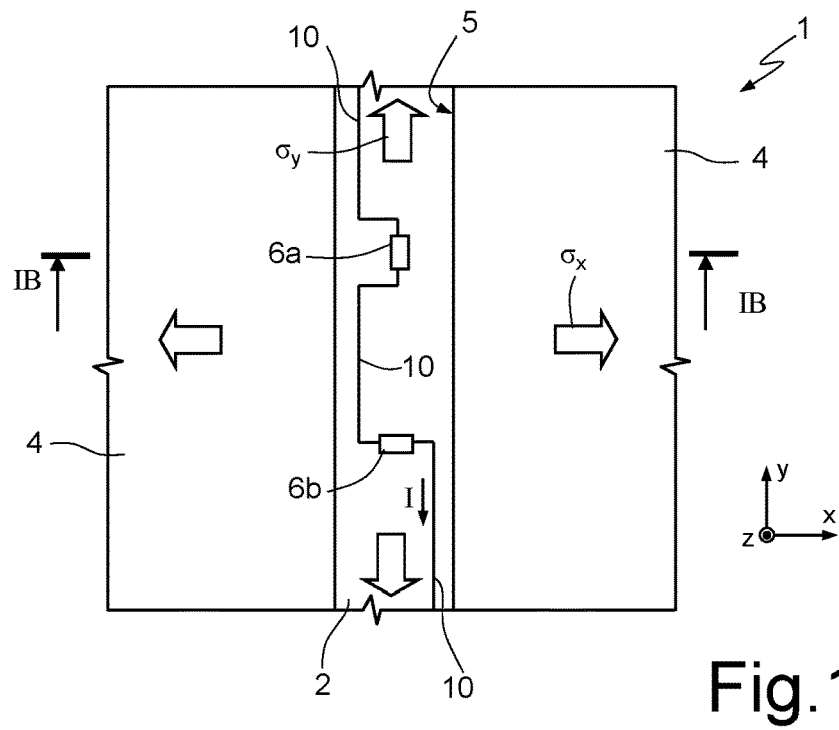
FIG. 1A is a schematic plan view of a force/pressure sensor without a cap die according to the present solution.
Figure 1B:
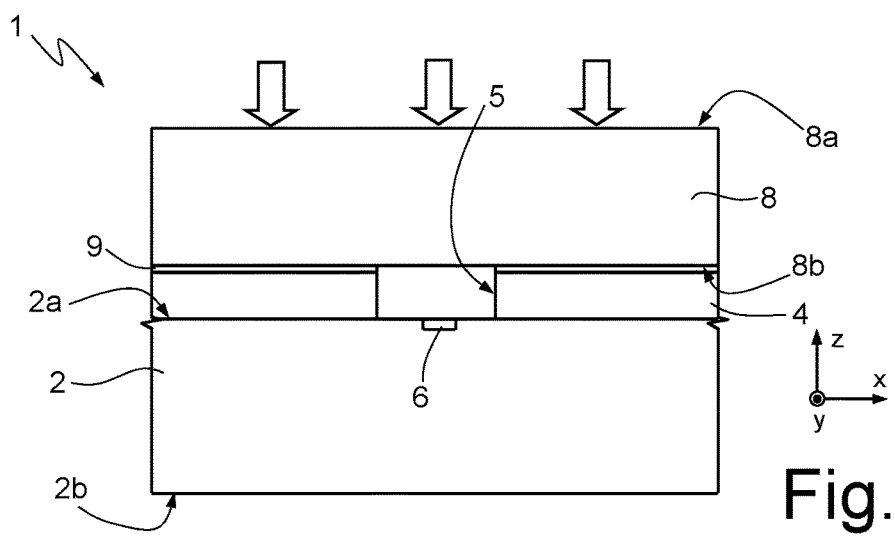
FIG. 1B is a schematic cross section of the sensor with the cap die of FIG. 1A.

Referring first to FIGS. 1A and 1B, the structure and operating principle of a force/pressure sensor 1 according to one embodiment are discussed in more detail.

The force/pressure sensor 1 comprises a first body that is a sensor die 2 of semiconductor material, in particular monocrystalline silicon. The sensor die has a top surface 2a, extending in a horizontal plane xy, defined by a first and a second orthogonal horizontal axes x, y, and a bottom surface 2b, and having a thickness t along a vertical axis z, orthogonal to the above horizontal plane xy. The sensor die 2 is a solid and compact monolithic body, having a substantially constant thickness (considered as the distance between the top and bottom surfaces 2a, 2b).

The force/pressure sensor 1 further comprises a conversion layer 4, arranged on the top surface 2a of the sensor die 2; the conversion layer 4 may be formed via deposition or growth, or any other suitable technique.

The conversion layer 4 is made of a proper rigid material, having a high enough Young modulus (for example in the range of 50-80 GPa); moreover, it is preferable for the conversion layer 4 to have a thermal coefficient close to the thermal coefficient of the material of the sensor die 2. For example, the conversion layer may be made of Polysilicon, $SiO_2$, $Si_3N_4$, or other different materials, such as $Al_2O_3$, $ZrO_2$, $TiB_2$, $B_4C$, SiC, WC, AlN, or BN.

The conversion layer 4 is patterned, e.g., via etching or any other suitable technique, to define a through opening or a groove 5, extending through an entire thickness of the conversion layer 4 along the vertical axis z. In the example shown in FIGS. 1A and 1i, the groove 5 has a longitudinal extension (or main extension) along the second horizontal axis y, and a transversal extension (much lower than the main extension) along the first horizontal axis x. In other words, the groove 5 has a length (along the second horizontal axis y) much greater than a respective width (along the first horizontal axis).

Piezoresistive elements 6 are formed in the bulk of the sensor die 2, next to the top surface 2a thereof, so as to be vertically arranged relative to the groove 5 (or arranged within the same groove 5 in plan view, in a section parallel to the top surface 2a and the horizontal plane xy).

In a known manner, the piezoresistive elements 6 may be formed via diffusion, or implantation, of dopant atoms within the sensor die 2. In the shown embodiment, the piezoresistive elements 6 have a substantially rectangular shape in plan view.

In particular, as shown in FIG. 1A, at least a first piezoresistive element 6a is arranged so as to have a respective longitudinal extension parallel to the longitudinal extension of the groove 5 (in the example, along the second horizontal axis y), and at least a second piezoresistive element 6b is arranged so as to have a respective longitudinal extension transverse to the longitudinal extension of the groove 5 (in the example, along the first horizontal axis x).

The force/pressure sensor 1 further comprises a second body that is a cap die 8 also of semiconductor material, in particular monocrystalline silicon (the cap die 8 is not shown in FIG. 1A, in order to show the underlying structure).

The cap die 8 is arranged above the sensor die 2, being coupled (bonded) thereto via a bonding layer 9, of a suitable material, e.g., glass frit; in the present embodiment, the bonding layer 9 is arranged on the conversion layer 4, having the same pattern of the conversion layer 4 (so that the groove 5 also extends through an entire thickness of the same bonding layer 9 along the vertical axis z); the bonding layer 9 is therefore interposed between the conversion layer 4 and a bottom surface 8b of the cap die 8.

During operation of the force/pressure sensor 1, a load (a force, or a pressure) is applied along the vertical axis z (as denoted by the arrows), to a top surface 8a of the cap die 8, opposed to the bottom surface 8b along the vertical axis z, and/or to the bottom surface 2b of the sensor die 2.

According to an aspect of the present solution, the conversion layer 4 operates to convert the vertically applied load into planar stresses, which may be sensed by the piezoresistive elements 6. In particular, the conversion layer 4 is configured to create a planar stress distribution at the groove 5 (i.e., in a region of the sensor die 2 vertically corresponding to the same groove 5), according to which the planar stress along the transversal extension of the groove 5 is maximized, and the planar stress along the longitudinal extension of the same groove 5 is minimized.

In the example shown in FIG. 1A, the planar stress along the first horizontal axis x, denoted with $\sigma_x$, is maximized, while the planar stress along the second horizontal axis y, denoted with $\sigma_y$, is minimized.

Accordingly, and due to the arrangement of the piezoresistive elements 6, the resistivity of one of the piezoresistive elements, in the example shown in FIG. 1A the first piezoresistive element 6a, decreases, while the resistivity of the other piezoresistive elements, in the example shown in FIG. 1B the second piezoresistive element 6b, has a corresponding increase.

Indeed, the resistivity of the piezoresistive elements 6 changes according to the following expression (representing, as an example, the piezoresistivity effect in p-doped silicon on monocrystalline plane <001>):

$$\frac{\Delta \rho}{\rho} \approx \frac{\Delta R}{R} \approx \pi_{in\_plane}(\sigma_{Li} - \sigma_{Ti})$$

where $\rho$ is the resistivity, R the resistance, $\sigma_{Li}$ and $\sigma_{Ti}$ are the induced stress with respect to the longitudinal and, respectively, the transversal direction of the piezoresistive element 6, and $\pi_{in\_plane}$ is given by:

$$\pi_{in\_plane} = \frac{\pi_{44}}{2} \cong 70e - 11[1/Pa]$$

It is immediate to verify that, for the first piezoresistive element 6a, the following expression holds:

$$\frac{\Delta \rho}{\rho} \approx \frac{\Delta R}{R} \approx \frac{\pi_{44}}{2}(\sigma_y - \sigma_x)$$

while, the resistivity variation for the second piezoresistive element 6b is given by:

$$\frac{\Delta \rho}{\rho} \approx \frac{\Delta R}{R} \approx \frac{\pi_{44}}{2}(\sigma_x - \sigma_y).$$

The first and second piezoresistive elements 6a, 6b thus undergo corresponding resistivity variations, with opposite sign (in the example, the first piezoresistive element 6a undergoes a negative variation, while the second piezoresistive element 6b a corresponding positive variation).

By properly connecting the same first and second piezoresistive elements 6a, 6b, as shown in the same FIG. 1A, via electrical connections 10 (so that an electric current I flows through the length, or longitudinal extension, of the same piezoresistive elements 6a, 6b), it is thus possible to implement a differential sensing of the resistivity change, and, therefore of the value of the applied force/pressure. Electrical connections 10 may be formed in the same sensor die 2, below the top surface 2a, e.g., via diffusion of dopant atoms (or via metallization on the surface of the sensor die 2, for regions which are not covered by the conversion layer 4).

According to an aspect of the present solution, advantageously, the force/pressure sensor 1 comprises a further pair of piezoresistive elements 6, and in particular a third 6c and a fourth 6d piezoresistive elements; in particular, the third piezoresistive element 6c is arranged so as to undergo a same resistivity variation as the first piezoresistive element 6a, and the fourth piezoresistive element 6d is arranged so as to undergo a same resistivity variation as the second piezoresistive element 6b.

Figure 2:
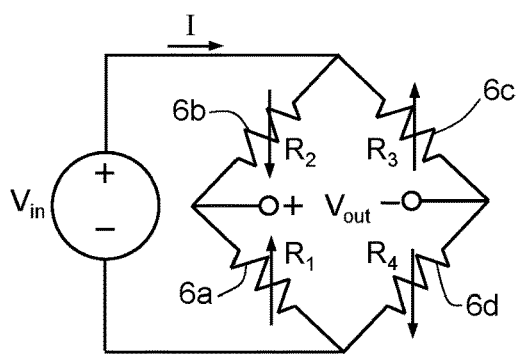
FIG. 2 shows the circuit diagram of a Wheatstone bridge in the force/pressure sensor.

As schematically shown in FIG. 2, the piezoresistive elements 6a-6d may be electrically connected to form a Wheatstone bridge; in particular, $R_1$, $R_2$, $R_3$ and $R_4$ denote the resistance of the first, second, third and fourth piezoresistive elements 6a, 6b, 6c, 6d, respectively; $V_{in}$ is a biasing voltage applied to the Wheatstone bridge; and $V_{out}$ an output voltage at the output of the same Wheatstone bridge.

As it is known, operation of the Wheatstone bridge is defined by the following expression:

$$\frac{V_{out}}{V_{in}} = \frac{2\Delta R_{1,3} - 2\Delta R_{2,4}}{4R + 2(2\Delta R_{1,3} + 2\Delta R_{2,4})} = \frac{\Delta R_{1,3} - \Delta R_{2,4}}{2R + 2(\Delta R_{1,3} + \Delta R_{2,4})}$$

Where, R is a common resistance value of the piezoresistive elements 6a-6d, when no stress is applied, and $\Delta R_{1-4}$ are the resistance variations of the same piezoresistive elements 6a-6d due to the applied stress.

Assuming that $\Delta R_1 = \Delta R_2 = \Delta R_3 = \Delta R_4 = \Delta R$, then:

$$\frac{V_{out}}{V_{in}} = \frac{\Delta R}{R}$$

i.e., the output voltage $V_{out}$ is directly proportional to the resistance change, and thus to the applied stress (force or pressure).

Figure 3A:
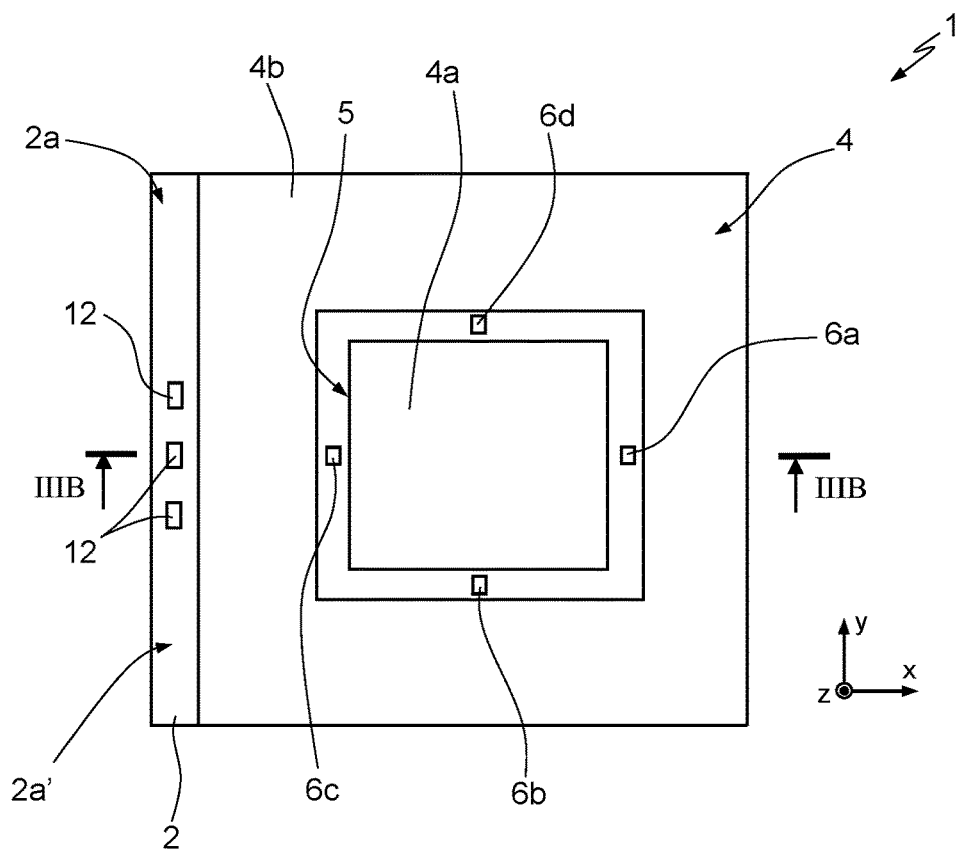
FIG. 3A is a plan view of a force/pressure sensor according to an embodiment of the present solution.
Figure 3B:
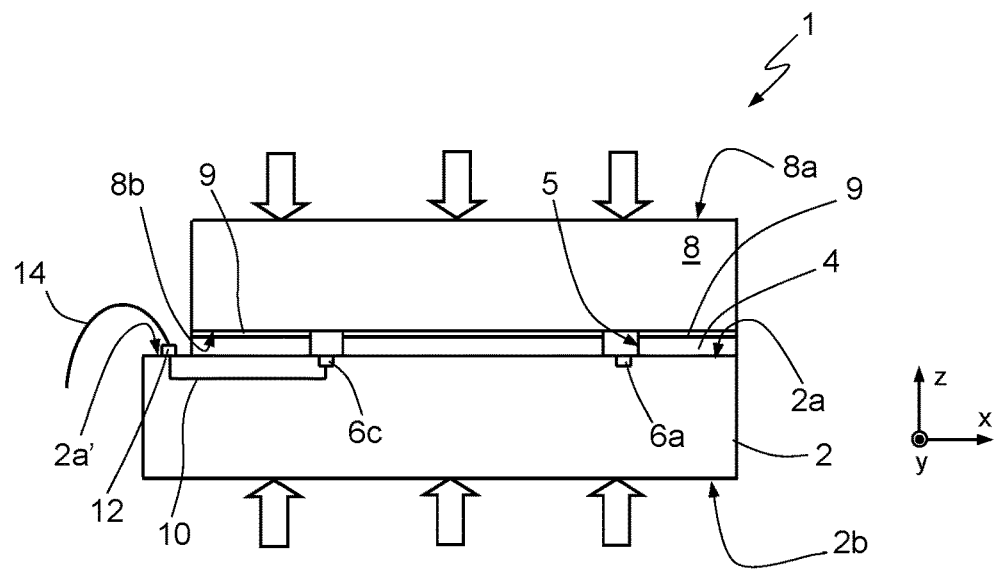
FIG. 3B is a cross section of the sensor of FIG. 3A.

With reference to FIGS. 3A and 3B, another embodiment of the present solution is now disclosed.

In this embodiment, the conversion layer 4 of the force/pressure sensor 1 is patterned so that the groove 5 has a square ring shape in plan view, having a first pair of groove portions extending along the first horizontal axis x, and a second pair of groove portions extending along the second horizontal axis y.

The groove 5 therefore defines two active areas 4a, 4b of the conversion layer 4, a first active area 4a internal to the groove 5 and a second active area 4b external thereto. The first and second 4a, 4b active areas are independently designed for the conversion of the load applied along the vertical direction into the planar stress distribution.

As previously discussed, the conversion layer 4 is configured to concentrate effectively the planar stresses, resulting from an applied vertical load (in the example, a force F), in the region of the sensor die 2 within the groove 5, perpendicularly to the longitudinal extension thereof.

In particular, the conversion layer 4 is arranged so that the planar stress $\sigma_x$ along the first horizontal axis x is maximized and the planar stress $\sigma_y$ along the second horizontal axis y is minimized at the second pair of groove portions (extending along the second horizontal axis y), while the planar stress $\sigma_y$ along the second horizontal axis y is maximized and the planar stress $\sigma_x$ along the first horizontal axis x is minimized at the first pair of groove portions (extending along the first horizontal axis x).

The first and third piezoresistive elements 6a, 6c are in this case arranged within a respective groove portion of the second pair of groove portions, while the second and fourth piezoresistive elements 6b, 6d are arranged within a respective groove portion of the first pair of groove portions.

Since the piezoresistive elements 6 are arranged all parallel to each other (all extending along the same direction, in the example along the second horizontal axis y), and the electrical current is made to flow through the length of the same piezoresistive elements 6 (as discussed before), the first and third piezoresistive elements 6a, 6c experience a decrease of resistance, while the second and fourth piezoresistive elements 6b, 6d experience a corresponding increase of resistance. The first and third piezoresistive elements 6a, 6c are indeed parallel to, while the second and fourth piezoresistive elements 6b, 6d are perpendicular to, the longitudinal extension of the groove 5.

As previously discussed, the piezoresistive elements 6a-6d may therefore be connected in a Wheatstone-bridge configuration, for conveniently detecting the value of the applied load (in the example, a force F).

As shown in the same FIGS. 3A and 3B, an external portion 2a' of the top surface 2a of the sensor die 2 is not covered by the cap die 8 (and the conversion layer 4). The external portion 2a' is for example rectangular in plan view, extending along the second horizontal axis y, at an outer lateral side of the sensor die 2.

Electrical contact pads 12 are formed at this external portion 2a', on the top surface 2a of the sensor die 2, and may be coupled to electrical wires 14, with the wire bonding technique. These electrical wires 14, in a known manner (not shown herein) may be coupled to external circuitry or electrical components, or to a printed circuit board (PCB), so as to provide towards the outside the output voltage $V_{out}$, indicative of the value of the sensed load (force or pressure) generated by the force/pressure sensor 1, and to provide to the same force/pressure sensor 1 the biasing voltage $V_{in}$, for supplying the Wheatstone bridge.

As schematically shown in FIG. 3B, electrical connections 10 are further provided within the sensor die 2, at the top surface 2a thereof, for electrical connection of (one or more) of the piezoresistive elements 6 to the electrical contact pads 12.

A coating region, here not shown, for example of an epoxy resin, may further be provided, to cover and protect the side portion 2a' of the sensor die 2 and the electrical wires 14, thus defining the package of the force/pressure sensor 1. It is emphasized that in the packaged force/pressure sensor 1, the top surface 8a of the cap die 8 and the bottom surface 2b of the sensor die 2 may be advantageously exposed to the outside environment and accessible for the direct application of the load to be sensed.

Figure 4A:
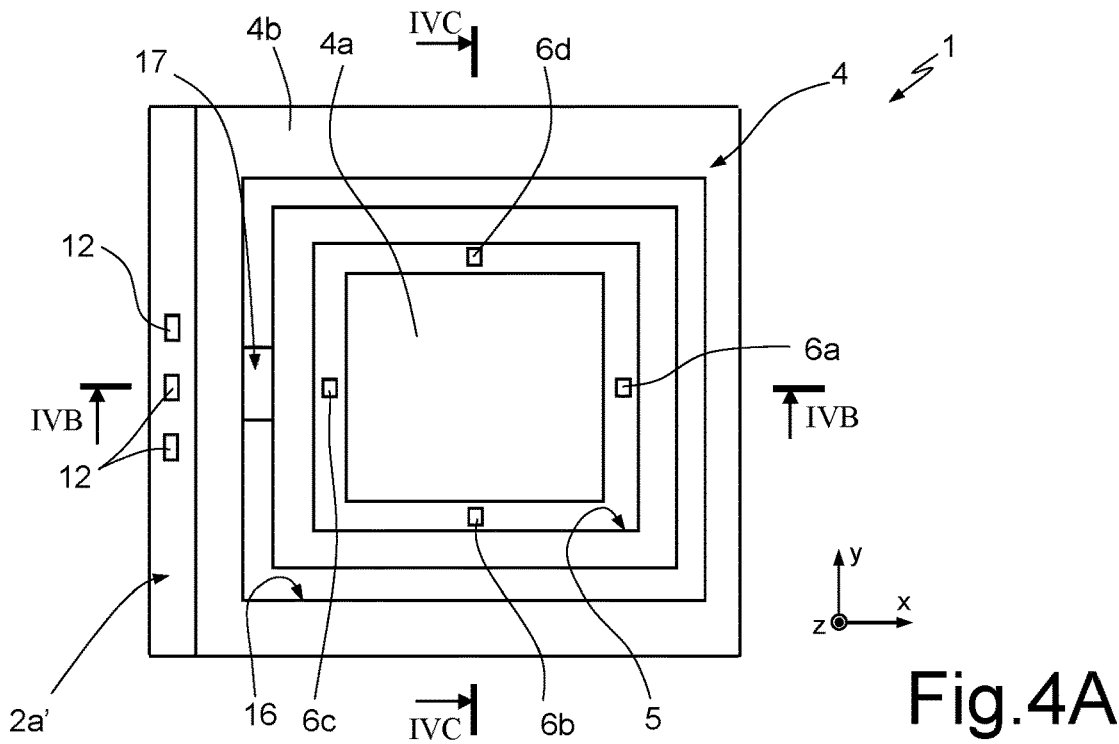
FIG. 4A is a plan view of a force/pressure sensor according to a further embodiment of the present solution.
Figure 4B:
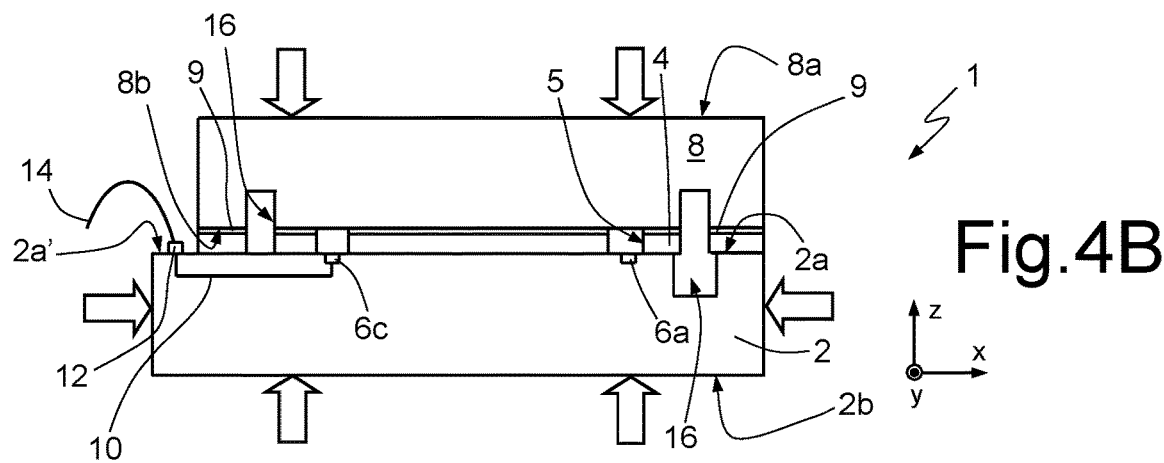
FIGS. 4B and 4C are cross sections of the sensor of FIG. 4A.
Figure 4C:
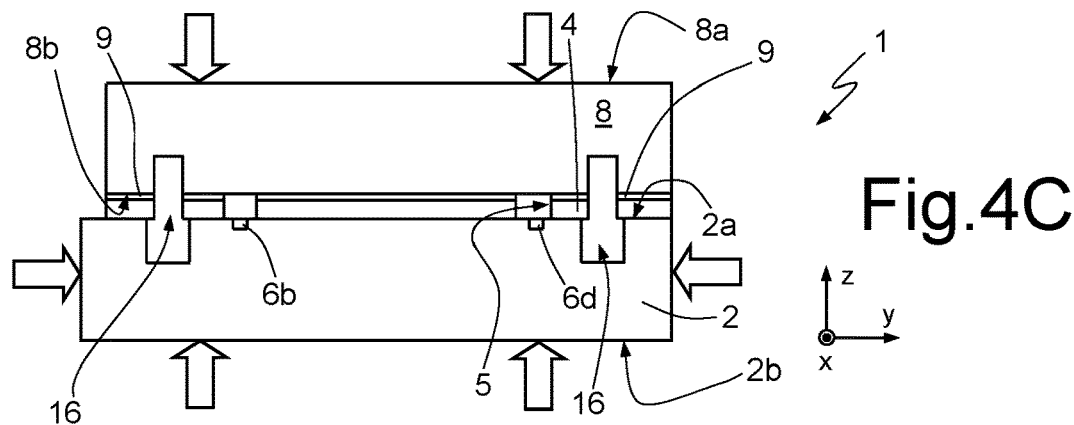

Referring now to FIGS. 4A, 4B and 4C, a further embodiment of the force/pressure sensor 1 is now discussed, which is particularly adapted to sense a hydrostatic pressure, whereby the same force/pressure sensor 1 is immersed in a fluid, whose pressure is to be measured. Just as an example, the groove 5 is again shown as having a square ring shape, as discussed before with reference to FIGS. 3A and 3B.

The difference of the present embodiment lies in the presence of an isolation trench 16, formed through a portion of the sensor die 2 and of the cap die 8, at the facing surfaces thereof (front surface 2a of the sensor die 2 and bottom surface 8b of the cap die 8), and moreover through the entire thickness of the conversion layer 4 (and bonding layer 9).

In the embodiment shown in the same FIGS. 4A-4C, the width of the isolation trench 16 (in the horizontal plane xy, along the first and second horizontal axes x, y) is higher in the sensor die 2 and conversion layer 4, and lower in the cap die 8.

The isolation trench 16 is arranged to surround the groove 5, externally thereto in the horizontal plane xy, having in this case a square ring shape as the same groove 5; the isolation trench 16 extends through the conversion layer 4, at the second active area 4b thereof, externally and laterally to the groove 5.

In particular, the isolation trench 16 extends in a continuous manner within the cap die 8 and through the conversion layer 4, completely surrounding the groove 5; while the same isolation trench 16 extends within the sensor die 2 surrounding the groove 5 except for a narrow portion 17, which is designed for passage of the electrical connections 10 (see in particular FIG. 4A and the cross-section of FIG. 4B).

The isolation trench 16 allows to elastically separate, or isolate, the sensitive part of the force/pressure sensor 1, in particular the piezoresistive elements 6, from stresses originating laterally to the side surfaces of the dies (sensor die 4 and cap die 8), as shown by the lateral arrows in FIGS. 4B and 4C.

In particular, due to the spring effect (elastic behavior) of the silicon walls all around the isolation trench 16, even if the hydrostatic pressure is applied all over and around the force/pressure sensor 1 (while immersed in the fluid), the sensitive part mainly senses the loads which are externally applied from the top and the bottom of the sensor, vertically to the horizontal plane xy, while the laterally applied loads substantially do not affect the same piezoresistive elements 6.

Accordingly, the isolation trench 16 causes the conversion layer 4 to operate substantially with the same exact operating principle of the previous structure (for dry applications), converting the external load into the planar stress distribution on top of the sensor die 2, within the groove 5, at which the piezoresistive elements 6 are arranged.

Figure 5A:
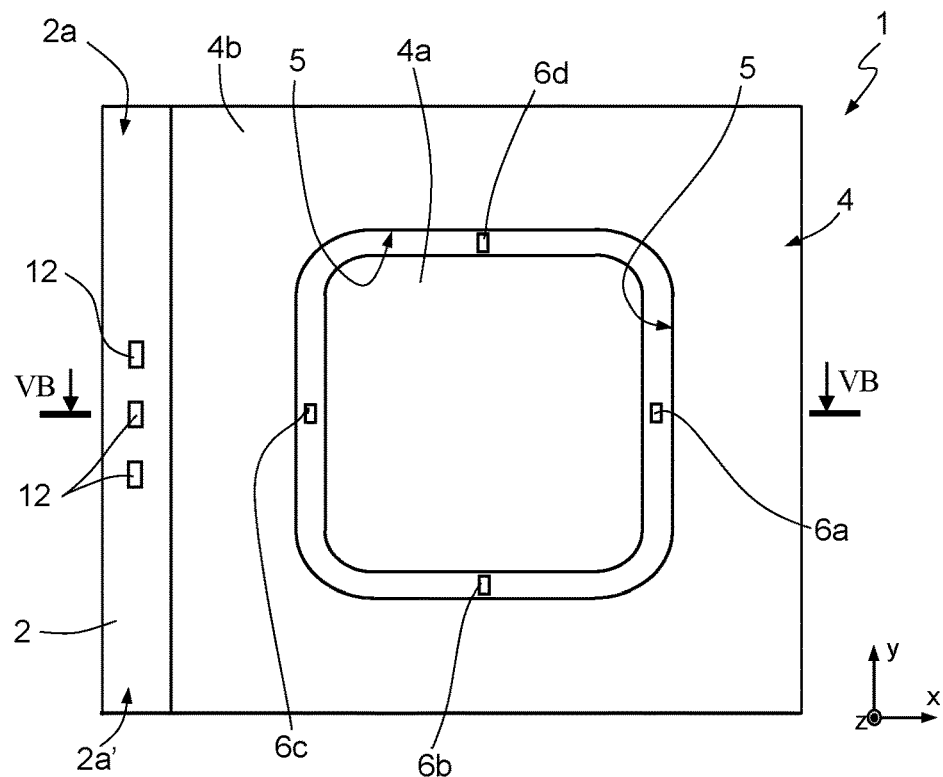
FIG. 5A is a plan view of a force/pressure sensor according to a still further embodiment of the present solution.
Figure 5B:
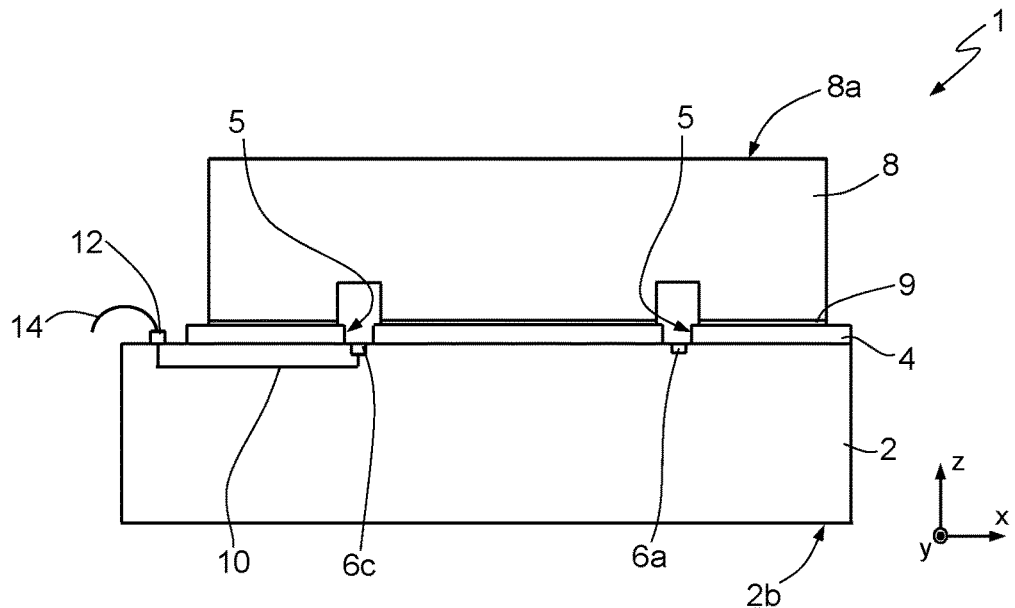
FIG. 5B is a cross section of the sensor of FIG. 5A.

As shown in FIGS. 5A and 5B, in a different embodiment, the groove 5 formed through the thickness of the conversion layer 4 (and bonding layer 9) may further extend, with fluidic continuity, through the cap die 8, in particular through a surface portion thereof, facing the sensor die 2.

In the embodiment shown in the same FIGS. 5A-5B, the width of the groove 5 (in the horizontal plane xy) is higher through the cap die 8 than through the conversion layer 4.

The presence of the groove 5 within the cap die 8 confers a spring behavior (i.e., elasticity) to the structure, which can be tuned by considering proper width and depth for the same groove 5, leading to two improvements in the functionality of the sensor: the sensor has improved stability (i.e., being less sensitive) with respect to temperature variations; and the load is more effectively converted into the planar stress distribution on top of the sensor die 2.

The advantages afforded by the present solution are clear from the foregoing description.

In any case, it is emphasized that the force/pressure sensor 1 according to the present solution has smaller size, compared to known load cells or sensors, for the same range of forces and does not require complex package design; the manufacturing process is simpler and not expensive, requiring manufacturing steps common to the MEMS manufacturing. The sensing area is protected from the external environment, in particular due to the presence of the cap die 8, allowing use also in harsh environments; the response to the applied load is very linear for a wide range of applied forces/pressures; even non homogenous external force distributions can be sensed (in particular, changing the size and positioning of the groove 5 will change the first and second active areas 4a, 4b of the conversion layer 4, resulting in different sensitivity for each independent area). Due to semi-uniform material characteristics through the entire structure, the force/pressure sensor 1 is suitable for applications with high temperature variation (i.e., the sensitivity is stable versus temperature); and the force/pressure sensor 1 can be easily scaled up/down for any possible application with different force/pressure ranges.

In particular, scaling of the sensing performance can be easily achieved by a proper sizing of the force/pressure sensor 1.

Figure 6A:
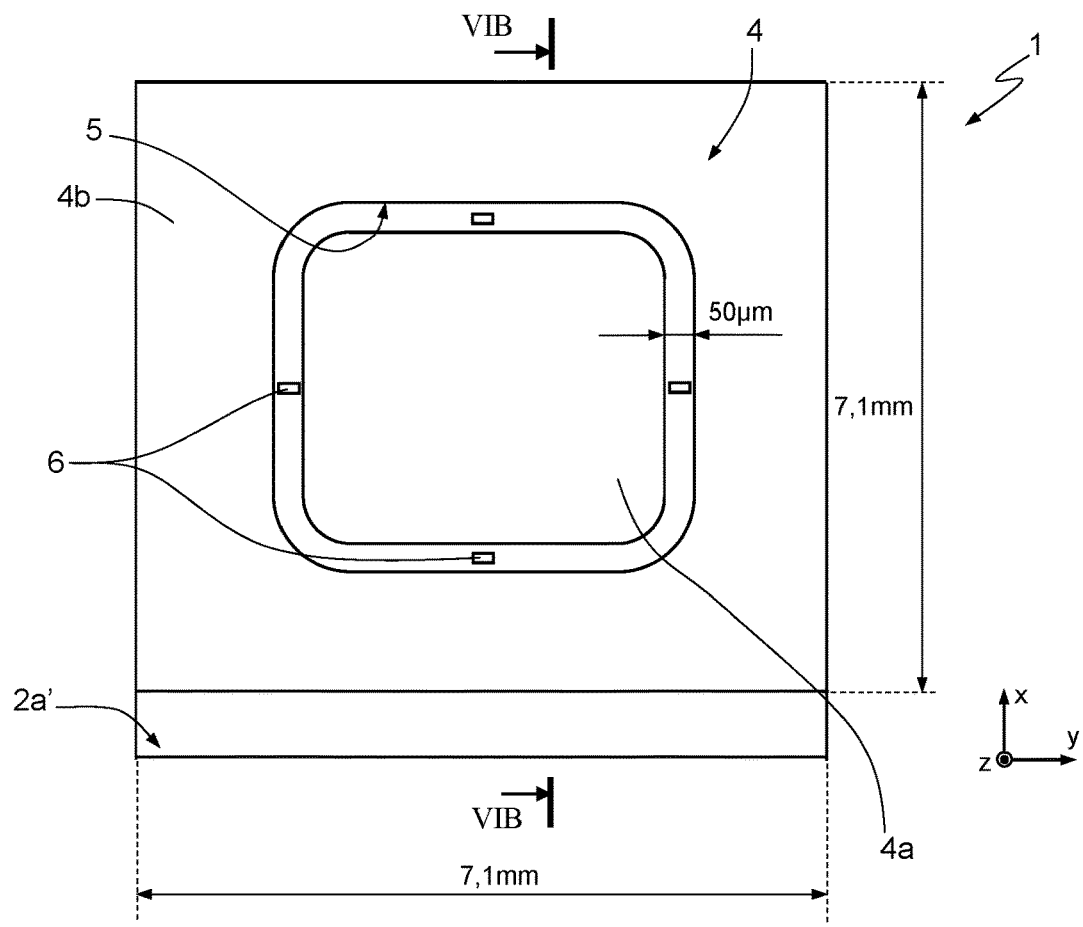
FIG. 6A is a plan view of a force/pressure sensor showing a possible sizing for high load application.
Figure 6B:
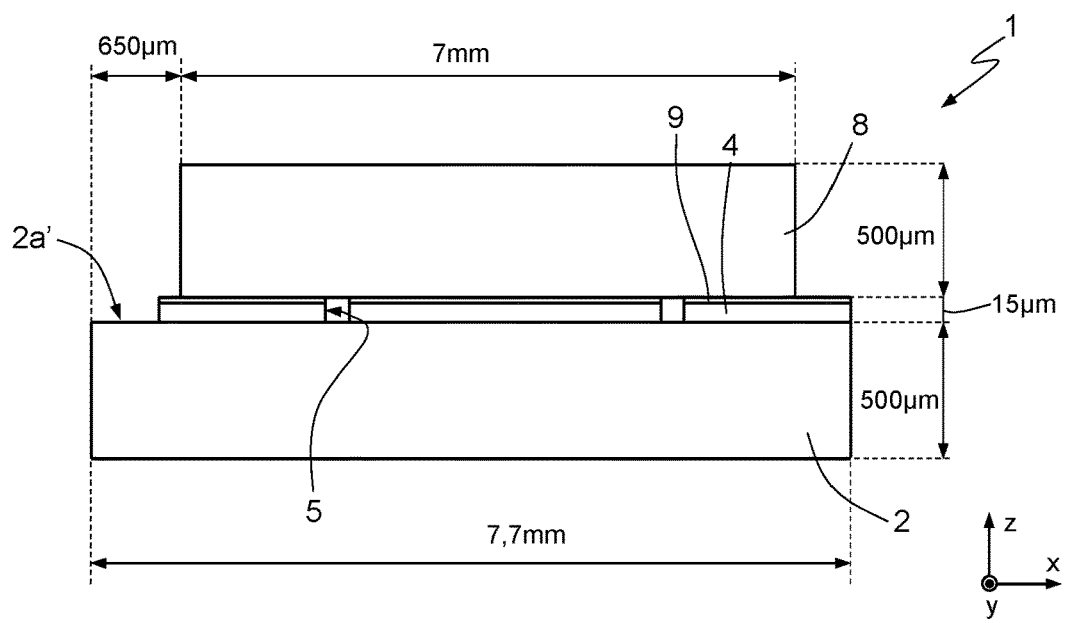
FIG. 6B is a cross section of the sensor of FIG. 6A.

In this respect, FIGS. 6A and 6B refer to an exemplary sizing of the force/pressure sensor 1, for high (or heavy) load applications.

In this example, the whole active area (i.e., the combination of first and second active areas 4a, 4b) is ≈48 mm$^2$; the applied external force is 12.6 kN; the equivalent applied stress is ≈262 MPa; the maximum Von-Mises stress is ≈700 MPa; the average output signal at full scale is ≈70 mV/V.

Figures 7A, 7B:
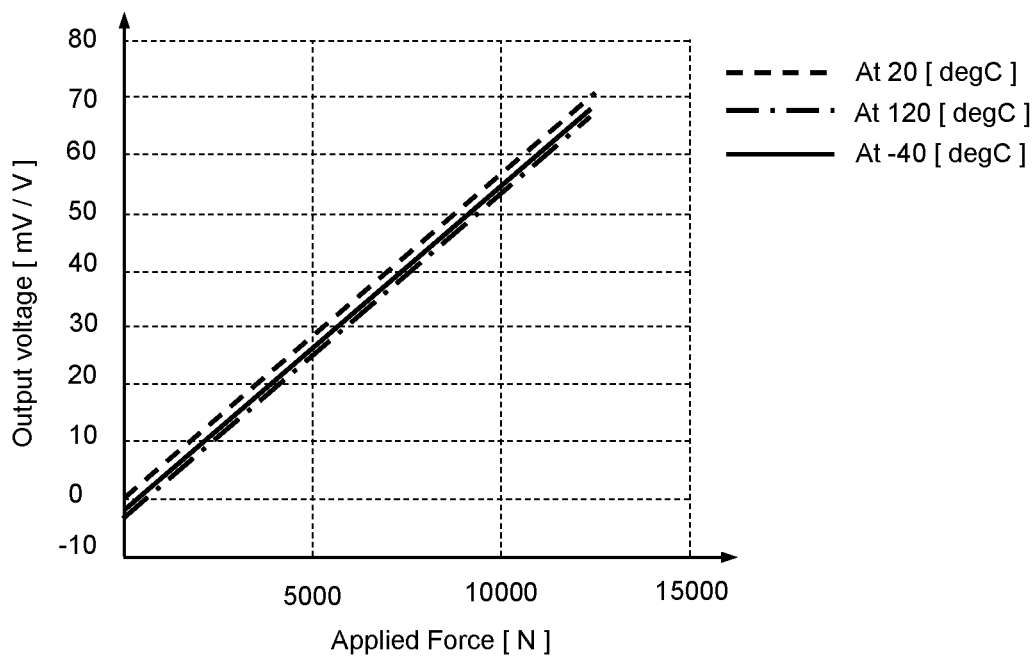
FIGS. 7A and 7B show electrical values and plots of electrical quantities relating to the sensor of FIG. 6A.

As shown in FIGS. 7A-7B, simulations performed by the Applicant confirm that there is a linear behavior between the applied external force and the corresponding output voltage $V_{out}$, which can be measured supplying an appropriate biasing voltage. Moreover, operation of the force/pressure sensor 1 at different temperatures is almost constant, i.e., very small changes in sensitivity occur at the different operating temperatures.

Figure 8A:
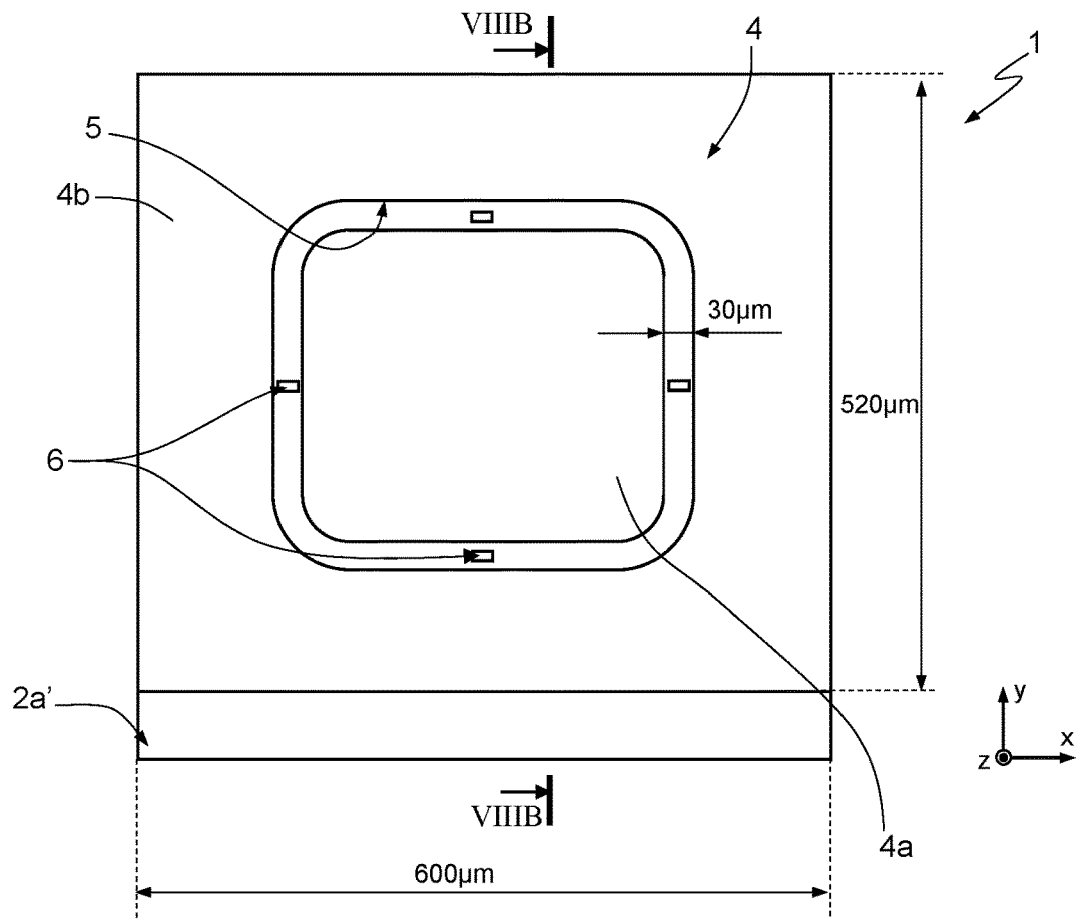
FIG. 8A is a plan view of a force/pressure sensor showing a possible sizing for low load application.
Figure 8B:
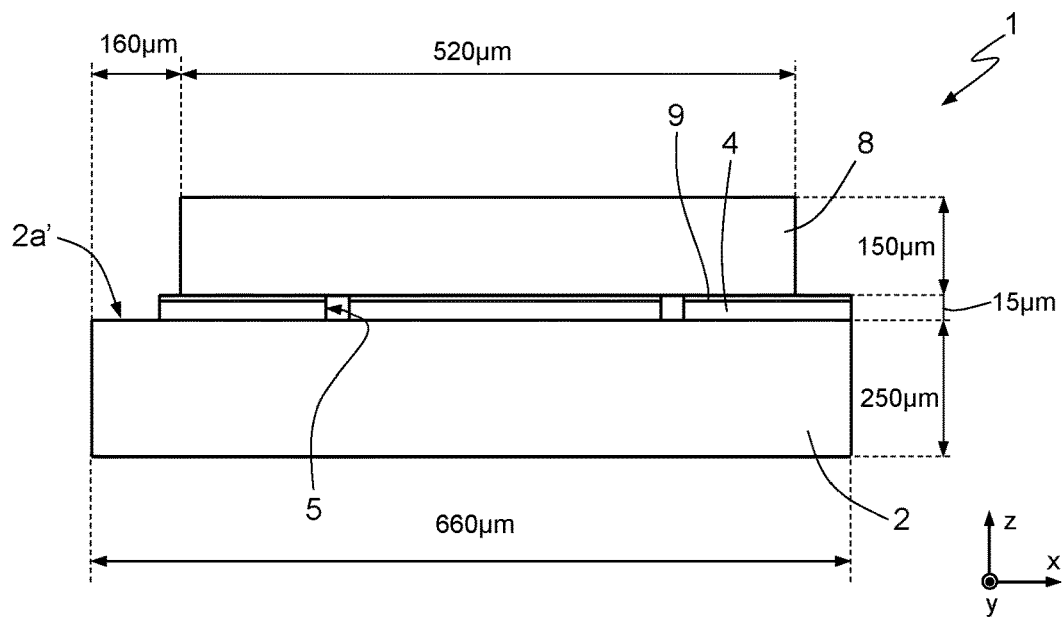
FIG. 8B is a cross section of the sensor of FIG. 8A.

FIGS. 8A and 8B refer to an exemplary sizing of the force/pressure sensor 1, this time for low (or light) load applications.

In this example, the whole active area is ≈0.27 mm$^2$; the applied external force is 64 N; the equivalent applied stress is ≈240 MPa; the maximum Von-Mises stress is ≈750 MPa; the average output signal at full scale is ≈65 mV/V.

Figures 9A, 9B:
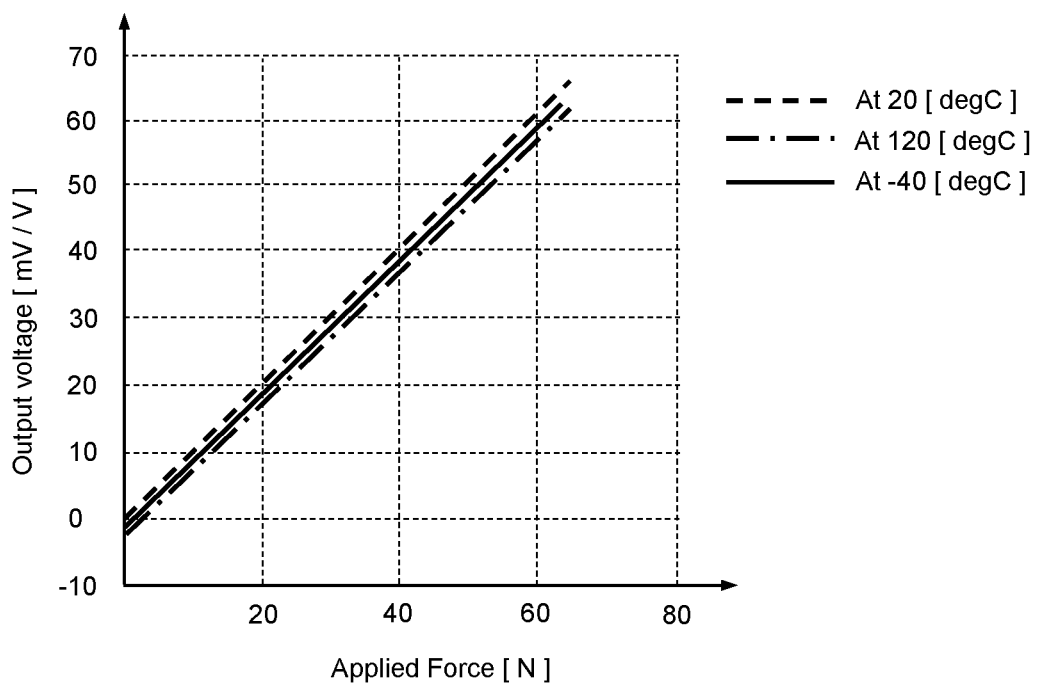
FIGS. 9A and 9B show electrical values and plots of electrical quantities relating to the sensor of FIG. 8A.

FIGS. 9A-9B show the results of the simulations performed by the Applicant, again proving a very good linear behavior and a substantially constant temperature sensitivity.

Figure 10A:
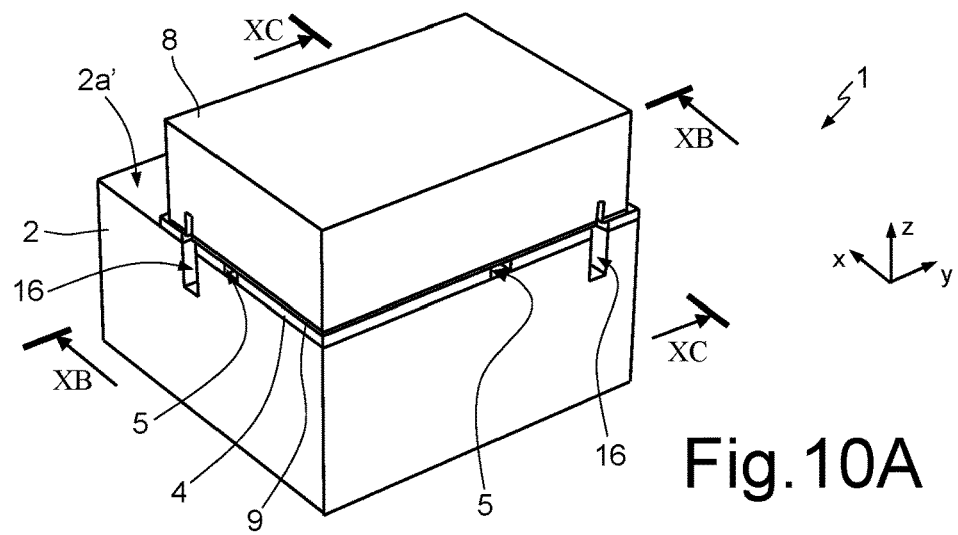
FIG. 10A is a plan view of a force/pressure sensor showing a possible sizing for hydrostatic application.
Figure 10B:
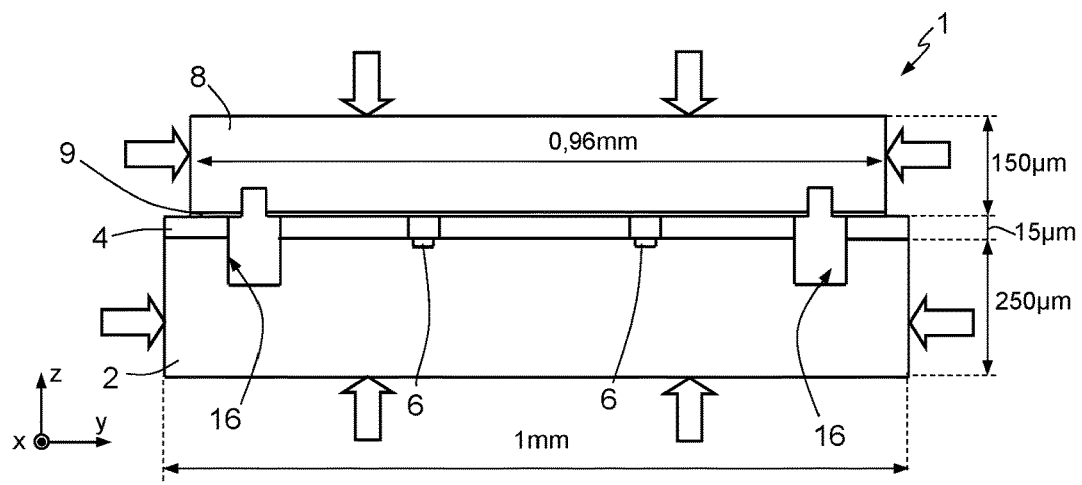
FIGS. 10B and 10C are cross sections of the sensor of FIG. 10A.
Figure 10C:
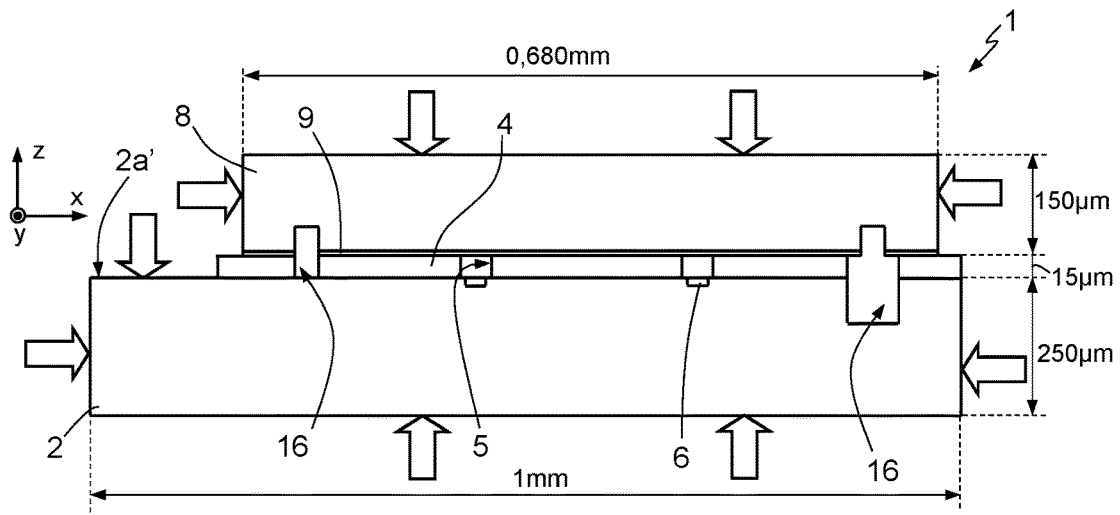

FIGS. 10A and 10B-10C refer to an exemplary sizing of the force/pressure sensor 1, this time for hydrostatic applications; the force/pressure sensor 1 therefore includes the isolation trench 16.

In this example, the applied external pressure is 600 bar; the equivalent applied stress is 60 MPa; the maximum Von-Mises stress is ≈700 MPa; the average output signal at full scale is ≈34 mV/V.

Figures 11A, 11B:
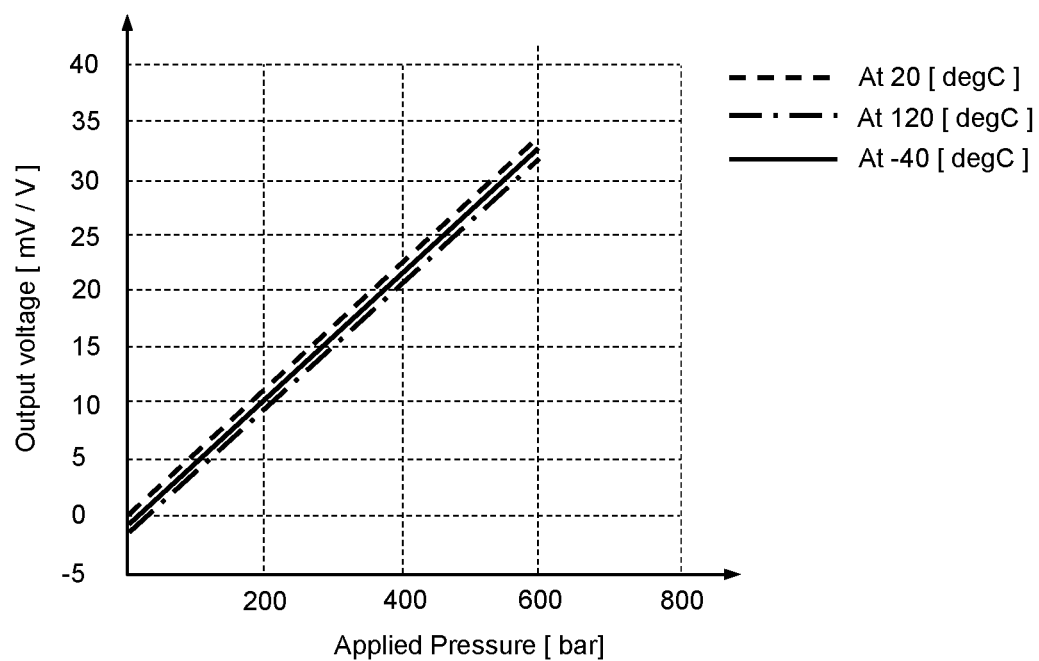
FIGS. 11A and 11B show electrical values and plots of electrical quantities relating to the sensor of FIG. 10A.

FIGS. 11A-11B show the simulation results relating to the embodiment of FIGS. 10A-10C, also in this case showing a very good linear behavior and a substantially constant temperature sensitivity.

Finally, it is clear that modifications and variations may be made to what has been described and illustrated herein, without thereby departing from the scope of the present disclosure.

In particular, it is emphasized that, depending on the application specification, different pattern layouts and different geometric characteristics may be envisaged for the conversion layer 4 of the force/pressure sensor 1.

In this respect, FIGS. 12A-12F show different sensor layouts, in terms of different pattern and geometric characteristics of the conversion layer 4.

In particular, FIGS. 12A, 12B, 12C show that the first and second active areas 4a, 4b (internal and external to the groove 5, in the example again having a square-ring shape) may have different surface extension, one with respect to the other, e.g. In order to comply to a non-homogeneous distribution of an applied load (force or pressure); also, the size of the groove 5 may be different in the horizontal plane xy, along the first and second horizontal axes x, y.

In these embodiments, the piezoresistive elements 6 are arranged, parallel to each other, with main extension along the first horizontal axis x.

The groove 5 in FIG. 12D is instead shaped like an "X", with two groove portions crossing at a center point; in this case, a first pair of piezoresistive elements 6 (denoted with 6a and 6c) are arranged within a first groove portion, with main extension parallel to the longitudinal extension of the same first groove portion; while a second pair of piezoresistive elements 6 (denoted with 6b and 6d) are arranged within the second groove portion, with main extension transverse to the longitudinal extension of the same second groove portion.

In the embodiments shown in FIGS. 12E and 12F, the groove 5 has a linear shape, with main extension along the second horizontal axis y (FIG. 12E) or the first horizontal axis x (FIG. 12F). In this case, the piezoresistive elements 6 are arranged within the groove 5, aligned along its main extension, arranged in pairs with longitudinal extension parallel, or transverse, thereto.

In general, it is emphasized that the size and shape, not only of the conversion layer 4 (and related groove 5), but also of the sensor die 2 and cap die 8 may differ, according to the application specifications.

Moreover, different types of material may be envisaged for the same conversion layer 4 (as previously discussed), and also for the sensor die 2 and cap die 8, which may be made, e.g., of polysilicon or epitaxial silicon. In particular, the conversion layer 4 could also be made of silicon (monocrystalline silicon, epitaxial silicon, or polysilicon), or even of suitable ceramic materials.

Furthermore, it is emphasized that the bonding layer 9 and the conversion layer 4 could be provided by a same layer, or region, of a suitable bonding material; in particular, in the case that the thickness of the bonding layer 9 may be sufficient to guarantee the desired conversion of the applied stress into a planar stress acting within the groove 5, the same boding layer 9 may also define the above discussed conversion layer 4.

Finally, it is emphasized that the type of load applied to the force/pressure sensor 1 could be force, pressure or shear.

The invention claimed is:

1. A microelectromechanical sensor, comprising:
   a sensor die of semiconductor material having a plurality of piezoresistive elements and a thickness extending in a vertical direction transverse to the horizontal plane;
   a cap die coupled to the sensor die and covering the plurality of piezoresistive elements; and
   a conversion layer between the sensor die and the cap die, the conversion layer including a through opening extending in the vertical direction,
   wherein the plurality of piezoresistive elements of the sensor die are at the through opening of the conversion layer, and wherein the conversion layer is configured to convert a load applied to the microelectromechanical sensor in the vertical direction.

2. The microelectromechanical sensor according to claim 1 wherein the through opening has a longitudinal main extension in a horizontal plane, and wherein a stress distribution defines a maximum planar stress in a direction transverse to the longitudinal main extension and a minimum planar stress in a direction parallel to the longitudinal main extension of the through opening.

3. The microelectromechanical sensor according to claim 1 wherein the load is applied to the cap die of the microelectromechanical sensor.

4. The microelectromechanical sensor according to claim 1 wherein the load is applied to the sensor die of the microelectromechanical sensor.

5. The microelectromechanical sensor according to claim 1 wherein the cap die is bonded to the sensor die by a bonding layer, wherein the bonding layer is interposed between the conversion layer and the cap die.

6. The microelectromechanical sensor according to claim 1, further comprising an isolation trench surrounding the through opening and extending through the entire thickness of the conversion layer and through a surface portion of the sensor die and cap die.

7. The microelectromechanical sensor according to claim 6 wherein the isolation trench is configured to elastically decouple a sensing area of the sensor die integrating the plurality of piezoresistive elements from force/pressure loads externally applied at lateral sides of the sensor die and cap die in a direction that is parallel to the horizontal plane.

8. The microelectromechanical sensor according to claim 1 wherein the sensor die and the cap die are made of monocrystalline silicon.

9. The microelectromechanical sensor according to claim 1 wherein the conversion layer is made of one of the following materials: Polysilicon, $SiO_2$, $Si_3N_4$, $Al_2O_3$, $ZrO_2$, $TiB_2$, $B_4C$, SiC, WC, AlN or BN.

10. The microelectromechanical sensor according to claim 1 wherein the through opening is one of a closed square shape, a rectangular that extends from a first side surface to a second side surface of the conversion layer, or an X-shape in plan view.

11. A method, comprising:
    forming a sensor die of semiconductor material, the sensor die having a thickness along a vertical direction, wherein the sensor die includes a plurality of piezoresistive elements;
    forming a conversion layer on a portion of a surface of the sensor die, the conversion layer being located outward of the plurality of piezoresistive elements and uncovered by the conversion layer; and
    coupling a cap die to the conversion layer, the cap covering the plurality of piezoresistive elements of the sensor die,
    wherein the conversion layer is configured to convert a load applied to at least one of the cap die or the sensor die into a planar stress.

12. The method according to claim 11 wherein conversion layer is formed from one of the following materials: Polysilicon, $SiO_2$, $Si_3N_4$, $Al_2O_3$, $ZrO_2$, $TiB_2$, $B_4C$, SiC, WC, AlN or BN.

13. The method according to claim 11 wherein forming the conversion layer comprises forming the conversion layer to include a through opening, the piezoresistive elements located at the through opening.

14. A MEMS device, comprising:
    a sensor die of semiconductor material having a plurality of piezoresistive elements;
    a conversion layer on the sensor die, the conversion layer having a through opening, the plurality of piezoresistive elements facing the through opening; and
    a cap die coupled to the sensor die, the cap located over the plurality of piezoresistive elements,
    wherein the conversion layer is configured to convert a load applied to the MEMS device into a planar stress.

15. The MEMS according to claim 14 wherein the through opening is one of a closed square shape, a rectangular that extends from a first side surface to a second side surface of the conversion layer, or an X-shape in plan view.

16. The MEMS according to claim 14 wherein the conversion layer is configured to convert the load when the load is applied directly to the cap die.

17. The MEMS according to claim 14 wherein the conversion layer is configured to convert the load when the load is applied directly to the sensor die.

18. The MEMS according to claim 14 wherein the plurality of piezoresistive elements are first and second piezoresistive elements orientated transverse with each other.

* * * * *